(12) United States Patent
Radar

(10) Patent No.: US 9,607,313 B2
(45) Date of Patent: Mar. 28, 2017

(54) TARGETED CONTENT STREAMING BANNERS

(75) Inventor: Olivier Jacques Alexandre Radar, Rockcliffe (CA)

(73) Assignee: BlackBerry Limited, Waterloo, Ontario (CA)

( * ) Notice: Subject to any disclaimer, the term of this patent is extended or adjusted under 35 U.S.C. 154(b) by 532 days.

(21) Appl. No.: 13/584,119

(22) Filed: Aug. 13, 2012

(65) Prior Publication Data

US 2014/0047005 A1 Feb. 13, 2014

(51) Int. Cl.
| | | |
|---|---|---|
| G06Q 30/02 | (2012.01) | |
| H04L 29/08 | (2006.01) | |
| H04N 21/43 | (2011.01) | |
| H04N 21/488 | (2011.01) | |

(52) U.S. Cl.
CPC ......... *G06Q 30/0241* (2013.01); *H04L 67/18* (2013.01); *H04N 21/4307* (2013.01); *H04N 21/4886* (2013.01)

(58) Field of Classification Search
None
See application file for complete search history.

(56) References Cited

U.S. PATENT DOCUMENTS

| | | | | |
|---|---|---|---|---|
| 6,799,327 | B1 * | 9/2004 | Reynolds et al. | 725/42 |
| 8,645,199 | B1 * | 2/2014 | Sarkar | G06Q 30/0273 705/14.1 |
| 8,725,559 | B1 * | 5/2014 | Kothari et al. | 705/14.1 |
| 2002/0077900 | A1 * | 6/2002 | Thompson et al. | 705/14 |
| 2005/0039135 | A1 * | 2/2005 | Othmer et al. | 715/774 |
| 2006/0282856 | A1 * | 12/2006 | Errico et al. | 725/46 |
| 2007/0174490 | A1 * | 7/2007 | Choi et al. | 709/246 |
| 2007/0180147 | A1 * | 8/2007 | Leigh | 709/246 |
| 2007/0239566 | A1 * | 10/2007 | Dunnahoo | G06F 17/30867 705/26.1 |
| 2008/0004952 | A1 * | 1/2008 | Koli | 705/14 |

(Continued)

FOREIGN PATENT DOCUMENTS

| | | |
|---|---|---|
| CA | 2823799 A1 | 2/2014 |
| WO | WO-2009020973 A1 | 2/2009 |

OTHER PUBLICATIONS

Broder, Andrei, et al. "A semantic approach to contextual advertising." Proceedings of the 30th annual international ACM SIGIR conference on Research and development in information retrieval. ACM, 2007.*

(Continued)

*Primary Examiner* — Scott B Christensen
*Assistant Examiner* — Lam Do
(74) *Attorney, Agent, or Firm* — Thomas Grzesik; Fleit Gibbons Gutman Bongini & Bianco P.L.

(57) ABSTRACT

An apparatus and method for providing a streaming banner promoting one or more items/content on mobile devices are disclosed herein. User activity information is determined based on a user interfacing with a mobile device. The user activity information is transmitted by the mobile device to a server. In response to receiving a streaming banner, the streaming banner is displayed at a pre-determined portion of a screen of the mobile device. The streaming banner recommends one or more applications that targets the user based on the user activity information and an initial application identification source.

14 Claims, 6 Drawing Sheets

(56) References Cited

U.S. PATENT DOCUMENTS

| | | | | |
|---|---|---|---|---|
| 2008/0059571 A1* | 3/2008 | Khoo | ............... | G06Q 30/02 709/203 |
| 2008/0133336 A1* | 6/2008 | Altman | ............ | G06Q 30/0207 455/456.1 |
| 2008/0168497 A1* | 7/2008 | Mitchem | ............... | 725/42 |
| 2008/0271072 A1* | 10/2008 | Rothschild et al. | ............ | 725/35 |
| 2008/0300983 A1* | 12/2008 | Chen et al. | ............... | 705/14 |
| 2009/0013275 A1* | 1/2009 | May et al. | ............... | 715/765 |
| 2009/0199107 A1* | 8/2009 | Lewis | ............... | G06Q 30/0241 715/745 |
| 2009/0199114 A1 | 8/2009 | Lewis et al. | | |
| 2009/0222348 A1 | 9/2009 | Ransom et al. | | |
| 2010/0031136 A1* | 2/2010 | Chen et al. | ............... | 715/234 |
| 2010/0125492 A1* | 5/2010 | Lin | ............... | G06Q 20/3274 705/14.5 |
| 2010/0138295 A1* | 6/2010 | Caron et al. | ............... | 705/14.49 |
| 2010/0145861 A1* | 6/2010 | Law | ............... | G06Q 20/102 705/76 |
| 2010/0211431 A1* | 8/2010 | Lutnick et al. | ............... | 705/10 |
| 2010/0222046 A1* | 9/2010 | Cumming | ............... | 455/418 |
| 2010/0269040 A1 | 10/2010 | Lee | | |
| 2011/0125594 A1* | 5/2011 | Brown | ............... | G06Q 30/02 705/14.73 |
| 2011/0196721 A1* | 8/2011 | Addante | ............... | 705/14.4 |
| 2011/0221568 A1* | 9/2011 | Giobbi | ............... | 340/5.82 |
| 2011/0238496 A1* | 9/2011 | Gurbuxani | ............ | G06Q 30/02 705/14.49 |
| 2011/0264736 A1 | 10/2011 | Zuckerberg et al. | | |
| 2011/0288917 A1 | 11/2011 | Wanek | | |
| 2011/0288931 A1* | 11/2011 | Kuhn | ............... | G06F 17/30864 705/14.49 |
| 2012/0036556 A1* | 2/2012 | LeBeau et al. | ............... | 726/3 |
| 2012/0179542 A1* | 7/2012 | Findlan | ............... | 705/14.49 |
| 2012/0185334 A1* | 7/2012 | Sarkar | ............... | G06Q 30/0251 705/14.58 |
| 2012/0259707 A1* | 10/2012 | Thielke et al. | ............ | 705/14.64 |
| 2012/0330758 A1* | 12/2012 | Kaushik | ............ | G06Q 30/0241 705/14.73 |
| 2013/0054329 A1* | 2/2013 | Bhatia | ............... | G06Q 30/02 705/14.23 |
| 2013/0054371 A1* | 2/2013 | Mason et al. | ............... | 705/14.64 |
| 2013/0159103 A1* | 6/2013 | Foroughi | ............ | G06Q 30/0269 705/14.53 |
| 2013/0173381 A1* | 7/2013 | Yerli | ............... | 705/14.43 |
| 2013/0332318 A1* | 12/2013 | D'Auria et al. | ............ | 705/27.1 |
| 2014/0149223 A1* | 5/2014 | Mathur | ............ | G06Q 30/0267 705/14.64 |

OTHER PUBLICATIONS

Kazienko, Przemysł aw, and Michał Adamski. "AdROSA—Adaptive personalization of web advertising." Information Sciences 177.11 (2007): 2269-2295.*

Dave Morin, Announcing Facebook Connect, May 9, 2008, https://developers.facebook.com/blog/post/2008/05/09/announcing-facebook-connect/.*

White, Ryen W., Peter Bailey, and Liwei Chen. "Predicting user interests from contextual information." Proceedings of the 32nd international ACM SIGIR conference on Research and development in information retrieval. ACM, 2009.*

"European Application Serial No. 12180346.4, Extended European Search Report mailed Apr. 5, 2013".

* cited by examiner

TARGETED CONTENT STREAMING BANNERS

TECHNICAL FIELD

The present disclosure relates generally to providing recommendations or advertisement. More particularly, the present disclosure relates to providing recommendations and advertisement on mobile devices.

BACKGROUND

One reason for popularity of mobile devices, such as smartphones, is due to the widespread availability of specialized applications (hereinafter referred to as "apps") operable on such devices. Each app caters to a specific interest or need, such as a game or serving coupons to a user based on location. It is not uncommon for an electronic storefront selling apps (also referred to as an app store) to offer upwards of tens to hundreds of thousands of apps for purchase and download. With such a large app library, however, comes difficulty in identifying apps of interest.

A particular app may come to a user's attention by word-of-mouth. The user may search the app library by keyword(s), category, highest customer reviews, top downloads, or other parameters to find an app suitable for the user's needs or interest. Alternatively the user may accidently find out about a particular app while doing some other task. Even when a particular app is known by the user, the user still has to take active steps to engage the app store, login, pay (if applicable), and download/activate/receive the app on his or her mobile device(s).

Thus, it would be beneficial to provide a mechanism that automatically notifies a user of specific apps that are likely to be of interest to that user. It would also be beneficial to identify apps to the user in a manner that the user is likely to view and engage. It would further be beneficial to provide integrated functionality to increase the likelihood of acquiring (rights to) an app in response to a recommendation.

BRIEF DESCRIPTION OF THE DRAWINGS

Some embodiments are illustrated by way of example and not limitations in the figures of the accompanying drawings, in which.

The headings provided herein are for convenience only and do not necessarily affect the scope or meaning of the terms used. Like reference numerals in the drawings denote like elements.

DETAILED DESCRIPTION

Described in detail below is an apparatus and method for determining and providing streaming banners including information about one or more items/content for display on mobile communication devices. The items/content featured in each streaming banner is targeted for the user of a given mobile communication device. Selection of the specific items/content is based on information relating to the user including, but not limited to, user profile preferences, user profiles of other users that are similar to the user's user profile, latest user activity on the mobile communication device, behaviors of the user's friends or those in the user's social network, and the like. The streaming banner includes actionable items corresponding to each item/content featured. When the user actuates (or otherwise expresses interest) an actionable item corresponding to a particular item/content, then a page associated with the given actionable item is displayed on the mobile communication device for the user to learn more about the item/content or make a purchase.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
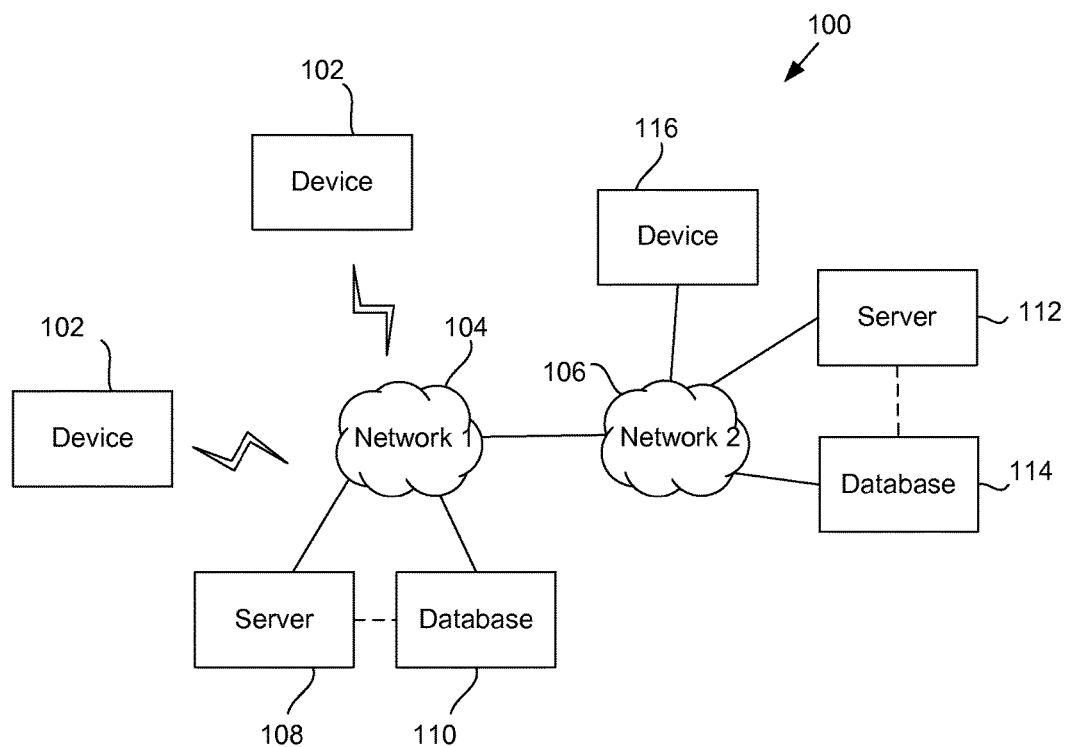
FIG. 1 illustrates an example system for providing targeted content streaming banners according to some embodiments.

FIG. 1 illustrates an example system 100 for providing targeted content streaming banners according to some embodiments. The system 100 includes a plurality of mobile devices 102, a first network 104, a second network 106, a first server 108, a first database 110, a second server 112, a second database 114, and one or more devices 116.

Each of the plurality of mobile devices 102 comprises a mobile communication device capable of wireless communication with the first network 104. Each of the mobile devices 102 comprises a computer or computing device, including but not limited to, a cellular or mobile phone, smart phone, tablet, portable digital assistant (PDA), Internet appliance, hand-held device, wireless device, portable device, laptop, netbook, ultrabook, wearable computers, multi-processor systems, microprocessor-based or programmable consumer electronics, mini-computers, and the like. In some embodiments, each of the mobile devices 102 includes, but is not limited to, an input sensor (e.g., camera, bar code reader, machine readable information reader, physical keyboard, virtual keyboard provided using software on a touch screen), transceiver, storage unit, display (e.g., touch screen), one or more input mechanisms (e.g., keyboard, trackball, trackpad, touch screen), and a processor. The processor is in communication with and configured to coordinate control of each of the input sensor, transceiver, storage unit, display, and input mechanisms. The mobile device 102 further includes one or more applications such as, but not limited to, a web browser, messaging application, and one or more apps acquired from an application store or library, and interface and communication capabilities to communicate with one or more components within the system 100. Mobile devices 102 can be geographically distributed from each other.

Device 116 is configured for wired and/or wireless (not shown) communication with the second network 106. Device 116 is otherwise similar to mobile devices 102. Although a single device 116 is depicted in FIG. 1, it is understood that a plurality of devices can communicate with the second network 106. Each of the mobile devices 102 and device 116 may also be referred to as a mobile device or a mobile communication device.

First network 104 (also referred to as network 1) comprises a wireless communications network such as, but not limited to, a cellular network, WiFi network, WiMax network, wireless local area network (WLAN), wireless wide area network (WWAN), wireless metropolitan area network (WMAN), wireless virtual private network (WVPN), an ad hoc network, or a combination of two or more such networks. When first network 104 comprises a public network, security features (e.g., VPN/SSL secure transport) may be included to ensure authorized access within the system 100.

Second network 106 (also referred to a network 2) comprises another communications network such as, but not limited to, a local area network (LAN), a wireless LAN (WLAN), a wide area network (WAN), a wireless WAN (WWAN), a metropolitan area network (MAN), a wireless MAN, a WiFi network, a WiMax network, an ad hoc network, an intranet, an extranet, a virtual private network (VPN), a portion of the Internet, the Internet, a portion of a public switched telephone network (PSTN), a cellular network, or a combination of two or more such networks. When second network 106 comprises a public network, security features (e.g., VPN/SSL secure transport) may be included to ensure authorized access within system 100. First and second networks 104, 106 are operably connected to each other.

Certain devices directly access first network 104 but not the second network 106 and vice versa. For example, the mobile devices 102 have direct access to the first network 104 but not necessarily a direct access to the second network 106. Conversely, the device 116 has direct access to the second network 106 but not the first network 104. In order to facilitate communication between networks 104 and 106, each of the networks 104, 106 includes servers, databases, switches, routers, base stations, repeaters, software, firmware, intermediating servers, and/or other components (not shown) to facilitate communication between components with access to the first network 104 (e.g., mobile devices 102, server 108, database 110) and components with access to the second network 106 (e.g., device 116, server 112, database 114). In one embodiment, the first network 104 comprises a cellular network and the second network 106 comprises the Internet.

Server 108 comprises one or more computers or processors configured to communicate with the mobile devices 102 and/or database 110 via the first network 104. Server 112 comprises one or more computers or processors configured to communicate with the device 116 and/or database 114 via the second network 106. Each of the server 108 and server 112 is configured to host one or more applications accessed by the mobile devices 102, 116; to provide processing functionalities for the mobile devices 102, 116; to provide data, content, images, audio, video, etc. to the mobile devices 102, 116; to track and monitor activities associated with the mobile devices 102, 116; and/or facilitate access to and store information in the databases 1110, 114. Each of server 108 and server 112 includes one or more of, for example, one or more web servers hosting e-commerce sites, one or more messaging servers (e.g., instant messaging (IM), short message service (SMS), text messaging, Blackberry Messenger, electronic mail (email), push messaging, and the like), one or more servers to track and gather user activity and preferences, one or more servers to provide recommendations, one or more servers hosting an app store, one or more payment infrastructure servers, and the like. More than one server can be associated with each of the first and second networks 104, 106.

Each of database 110 and database 114 comprises one or more storage devices configured to store data and/or instructions for use by server 108, server 112, mobile devices 102, and/or device 116. The content of database 110 is accessed via the first network 104 or directly by the server 108. The content of database 114 is accessed via the second network 106 or directly by the server 112. The content of each of databases 110, 114 includes, but is not limited to, user profiles, social graphs, device information, social graphs, user preferences, app library, advertisements, music library, video library, image library, and the like. Database 110 and database 114 may be located at one or more geographically distributed locations from each other and also from the servers 108, 112. Alternatively, one or more of databases 110, 114 may be included within respective servers 108, 112.

Alternatively, although the first network 104 and second network 106 are shown as two networks, the two networks can be implemented together as a single network configured to support both wireless and wired communications. In this configuration, servers 108, 112 can be combined together and databases 110, 114 can also be combined together.

Figure 2:
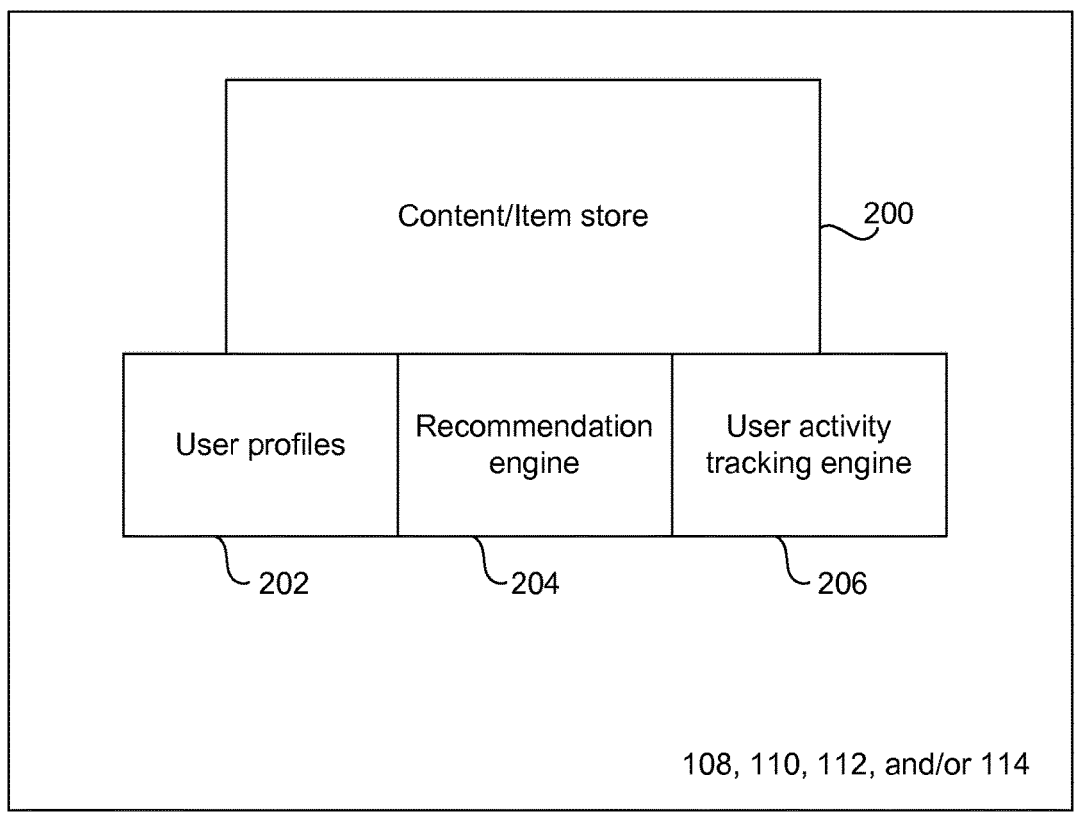
FIG. 2 illustrates example components included in one or more servers and databases of FIG. 1 to implement the operations and functionalities of FIG. 3 according to some embodiments.
Figure 3:
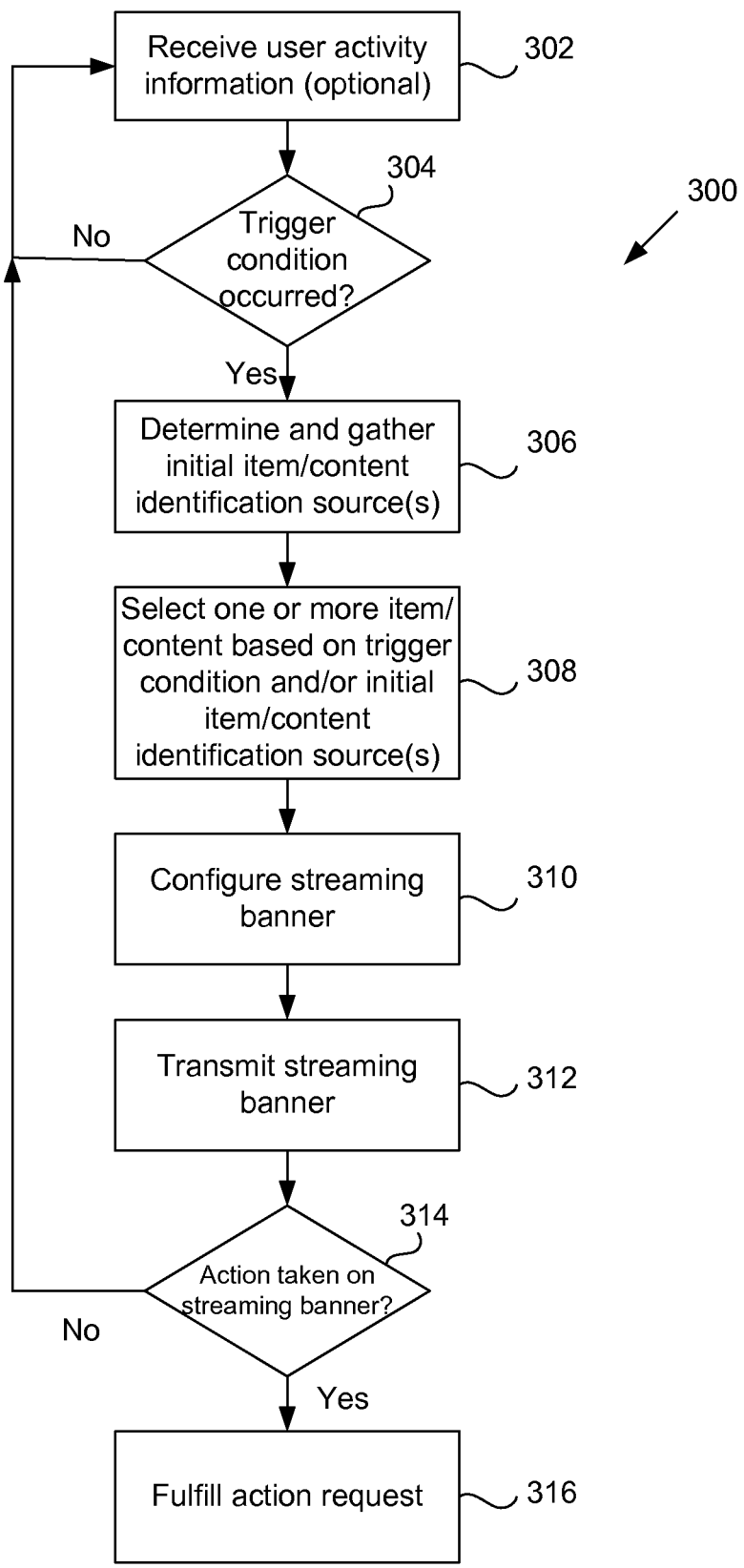
FIG. 3 illustrates an example flow diagram for providing targeted content streaming banners according to some embodiments.

FIG. 2 illustrates example components included in the server 108, database 110, server 112, and/or database 114 to implement the operations and functionalities of FIG. 3 according to some embodiments. FIG. 3 illustrates an example flow diagram 300 for providing targeted content streaming banners according to some embodiments. FIGS. 2 and 3 are discussed below in conjunction with each other. Although the discussion below is associated with providing streaming banners including app information, it is understood that other information can be similarly included in streaming banners. Music, video, digital media, product, and/or service information are other content/item type information that can be provided in streaming banners. It is also understood that while mobile devices 102 are discussed below with respect to streaming banners, similar operations can occur using device 116.

The components of FIG. 2 are representative of data and code base or instructions (software components, applications, apps, modules, application programming interfaces (APIs), and the like) configured to be accessed or executed by one or more processors included in the server 108, database 110, server 112, and/or database 114. FIG. 2 includes a content store/provider component 200, a user profiles component 202, a recommendation engine component 204, and a user activity tracking engine component 206. One or more of the components can be located geographically distributed from each other. The user profiles component 202 may be located, for example, in database 110 while the recommendation engine component 204 is located in server 108.

As described in detail below, the recommendation engine component 204 (also referred to as a recommendation engine) uses the data from at least the user profiles component 202 and the user activity tracking engine component 206 to determine and provide recommendations such as streaming banners advertising apps displayed on a display of mobile devices 102. The recommendation engine component 204 interfaces with the content store component 200 to formulate recommendations likely to drive traffic to specific content available at the content store component 200. The content store component 200 comprises a virtual storefront or repository that offers a plurality of content (e.g., apps, music, video, images, digital media), products, services, and other items/content available for purchase or access. Digital content can also be downloaded from the content store component 200, including automatic push to the user's mobile device(s) 102, upon completion of the purchase or access process. The content store component 200 can comprise a destination or service directly provided by the first network 104 (e.g., cellular network provider), a destination or service directly provided by the device manufacturer or an operating environment associated with the device (e.g., Blackberry App World®), an online website, a third party provided destination or service, and variants thereof. The content store component 200 is also referred to as an electronic commerce (e-commerce) store, e-commerce storefront, online items/content site, application or app e-commerce store, application or app e-commerce site, and the like. Although components 200-206 are shown as distinct components in FIG. 2, it should be understood that components 200-206 may be implemented as fewer or more components than illustrated. It should also be understood that any of components 200-206 may communicate with one or more components included in the system 100, such as server 108, database 110, server 112, database 114, mobile devices 102, or device 116.

In some embodiments, each of the mobile devices 102 receiving recommendations from the recommendation engine component 204 has installed a device client component (e.g., cookies, widget, modules, apps) that facilitates tracking user actions/activity on the mobile device 102, communicating tracked user action/activity to the user activity tracking engine 206, properly displaying received recommendations from the recommendation engine 204, and other such activities. In other embodiments, the device client component installation is optional or it not required for the recommendation engine component 204 to provide relevant recommendations to the mobile devices 102, 116.

FIG. 3 illustrates an example flow diagram 300 for providing targeted recommendations to mobile devices 102, in particular, streaming banners promoting targeted apps, according to some embodiments. At a block 302, the user activity tracking engine component 206 receives user activity information on a given mobile device 102. The user activity information is periodically provided, by the user's mobile device 102 automatically in response to occurrence of a certain action, in response to a request by the user activity tracking engine component 206, and/or forwarded by the network provider in the course of the network provider fulfilling device requests. User activity information comprises information corresponding to the user actions on the user's mobile device 102 including, but is not limited to: geo-location information associated with the current location of the user's mobile device 102, use of a particular app, product or service purchases, digital media purchases (e.g., songs, movies, television shows), songs played on the mobile device 102, online search terms, online websites visited, apps downloaded on the mobile device 102, subject matter of messages sent and received on the mobile device 102, user unlocking the mobile device 102, and a variety of other activities or actions taken on the mobile device 102.

Next at a block 304, the recommendation engine component 204 checks whether a trigger condition(s) is met to provide or update a streaming banner to a given device. Determining satisfaction of the trigger condition(s) is based on the user activity information received at block 304 or it can be system triggered independent of user activity. In the latter case, block 302 may be optional. Examples of triggering conditions include, but are not limited to, the mobile device 102 being in proximity to a sponsor retailer, the mobile device 102 being in proximity of a product (detected via near field communication (NFC)), time limit reached for the existing streaming banner displayed on the mobile device 102, a new app available on the content store, other user(s) having a similar user profile to a given user has downloaded a particular app, other user(s) in the same social network as a given user has downloaded a particular app, other user(s) having similar user profiles to or are in the same social network as the given user is using a particular app, an app available on the content store matches the given user's profile preference (e.g., user just changed his profile preference indicating that he likes games and productivity apps but not reading apps), the given user is searching for apps via a web browser or in the content store, and the like. The recommendation engine component 204 may access data or otherwise coordinate with the user profiles component 202 and/or user activity tracking engine component 206 to check for the trigger condition(s).

If the trigger condition is not met (no branch of block 304), then flow diagram 300 returns to block 302 to receive additional user activity information and/or to wait for a trigger condition to occur. Otherwise the trigger condition is satisfied (yes branch of block 304) and the recommendation engine component 204 proceeds to determine and gather recommendation data mining source(s) at a block 306. For example, if a streaming banner is to promote one or more apps based on apps that other users with similar profiles downloaded, then the recommendation engine component 204 determines which user profile parameters are of interest and the requisite similarity threshold. The recommendation engine component 204 also interfaces with the user profiles component 202 to obtain the user profiles. There may be one or more sets of user profiles, each maintained by a different entity. For example, separate user profiles can be maintained by a device manufacturer, a network provider, and the content store component 200. The network provider's user profiles may include more data about app usage on the devices, while the content store's user profiles may include which apps were downloaded for which user accounts but limited information about actual app usage on the respective mobile devices 102. The user profile parameters of interest may comprise non-app specific data, such as age, profession, household income, product purchase history (e.g., shoes, electronics), and the like.

As another example, if a streaming banner is to be configured based on apps that a user's friend has on his/her mobile device (which could be another one of the mobile devices 102), then the recommendation engine component 204 accesses or generates a social graph associated with the user. The social graph specifies the user's friends and/or their profiles, or at least provides login or identifier type of information to access social media site(s) to look-up who the user's contacts are and their activities or interests. The social media site may reveal, for example, that one of the user's contacts (e.g., a friend) is discussing a particular app (or song or other items to recommend) that the user doesn't have on his/her mobile device 102. Alternatively, the social media site(s) are used to identify the user's contacts, and then look-up those contacts' user profiles via the user profiles component 202 to determine which apps they have installed on their mobile devices that are not on the user's mobile device 102.

As still another example, a streaming banner may be populated with new apps or apps selected for promotion by the content store component 200. As another example, the streaming banner is populated by apps matching user profile preferences—expressly specified by the user (e.g., user specified an interest in word games during account setup) and/or based on user activity (e.g., user downloads word game apps).

Next at a block 308, the recommendation engine component 204 is configured to select one or more specific items/content (e.g., apps, music, video, digital media, product, service, etc.) from an items/content library or catalog to be promoted in the streaming banner. The selection is made in accordance with the trigger condition and/or the recommendation data mining sources (also referred to as initial/provisional content identification source(s)) gathered in block 308. If the streaming banner includes information about more than one item/content, then each of those items/content can be selected based on different criteria relative to each other. In the case of the items/content comprising apps, for example, one or more specific apps is selected as follows to be announced, promoted, recommended, marketed, offered for sale, or otherwise included in the streaming banner: (1) select app(s) downloaded by other users having user profiles similar to the user profile of a user of the given mobile device 102, (2) select app(s) identified/downloaded by the user's contacts/friends or those in the user's social network, (3) select app(s) matching user profile preferences or latest user activity, and/or (4) select app(s) that are already designated by an items/content store (e.g., new apps, sponsored apps, randomly selected apps of the day).

The selected content either matches exactly the content identified by others or matches some aspect of the content identified by others. For example, the selected content may exactly match the content purchased by others having user profiles similar to the user's profile. Conversely, the selected content may match the subject matter category, price, or other aspect of the content specified by other users but not necessarily be identical to the content specified by others. If the selected content is based on system set considerations, then user activities and interests may or may not be taken into account in the selection of the content. The content store may promote a new app to all of the mobile devices 102 based on its newness alone, or target the new app only to those users that have shown a preference for the same type of apps as the new app.

The recommendation engine component 204 at a block 310 configures a streaming banner using the selected content. Configuration includes formatting appropriate for the user's mobile device 102's screen parameters; generating/gathering graphics, text, icons, hyperlinks, actionable items, and other visual information associated with the selected content; and generating instructions to the given mobile device 102 associated with the streaming banner such as setting a time period for display or persistence across different screen pages. Streaming banners are also referred to as in-stream advertisement, in-stream ads, streamer advertisement, steamer ads, streamers, animated banners, animated banner ads, and similar variants.

Next the streaming banner is transmitted to the user's mobile device 102 at a block 312. If the user takes action on the streaming banner displaying on his/her mobile device 102 (yes branch of block 314), then the appropriate server 108, 112 responds to fulfill the action request at a block 316. If the user does not take any action on the streaming banner (e.g., user expresses no interest in the streaming banner) (no branch of block 314), then flow diagram 30 returns to block 302 to await user activity information. User action includes, but is not limited to, clicking, tapping, swiping, or other expression of interest in (or actuation of) an actionable portion of the streaming banner associated with a specific content. For example, tapping on a graphic of a specific app included in the streaming banner causes the user's mobile device 102 to display a detailed information, download, and/or purchase page for the specific app at the content store component 200. The user may additionally be automatically logged into the content store (e.g., an e-commerce site or web storefront) to facilitate obtaining the specific app.

Figure 4:
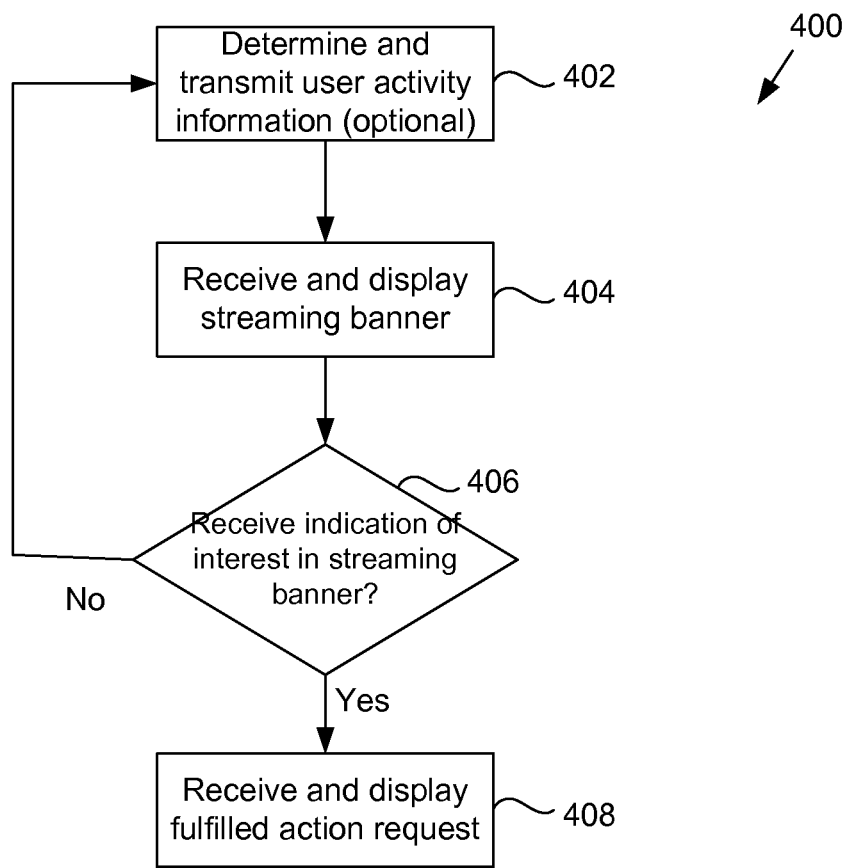
FIG. 4 illustrates an example flow diagram showing operations and functionalities performed by a mobile device associated with providing a streaming banner to the user according to some embodiments.

FIG. 4 illustrates an example flow diagram 400 showing operations and functionalities performed by each of the mobile devices 102 associated with providing a streaming banner to each user of the respective mobile devices 102 according to some embodiments. FIGS. 5A-5D illustrate example screen views displayed on a display of a given mobile device 102 showing the streaming banner according to example embodiments. FIGS. 4 and 5A-5D are discussed below in conjunction with each other.

At a block 402, the mobile device 102 transmits user activity information for receipt by the user activity tracking engine component 206. The tracking, gathering, and transmission of the user activity information can be controlled by the device client installed on the mobile device 102. The receipt of the user activity information is discussed above with respect to block 302 of FIG. 3. And as discussed for block 302, block 402 is optional when a streaming banner is triggered without use of user activity information.

Next at a block 404, the mobile device 102 receives and displays the streaming banner provided by the server 108 or 112 on a display/screen included in the mobile device 102. An example pathway comprises the streaming banner from the server 108 received by one or more of mobile devices 102 via the first network 104. Another example pathway comprises the streaming banner from the server 112 being received by one or more of mobile devices 102 via the second network 106 and the first network 104. In one embodiment, the streaming banner is provided on the bottom portion of the screen, and is included in the locked and unlocked home pages/screen. Text, graphic, icon, hyperlink, actionable item/indicator, and other presentation material associated with each content being promoted/marketed in the streaming banner is presented as animated elements, such as scrolling from left to right (or right to left), blinking, changing colors, or the like. Content represented in the streaming banner can be the same (e.g., all apps) or of dissimilar types to each other (e.g., an app, a song, and headphones). Content represented in a streaming banner includes, but is not limited to, one or more of a song, a video, a product, a digital media, a service, and an app.

Figure 5A:
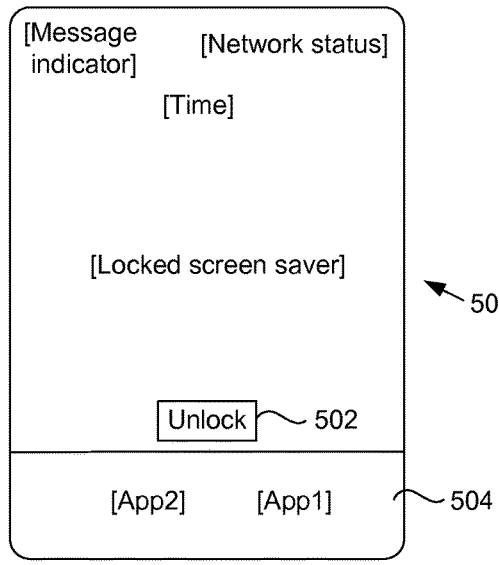
FIGS. 5A-5D illustrate example screen views showing the streaming banner according to some embodiments.
Figure 5B:
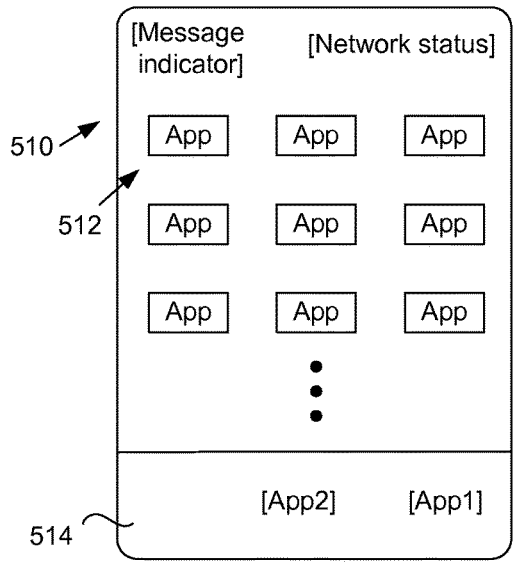

FIG. 5A shows an example locked home page or screen 500 including indication that the device is locked, an unlock icon 502, and a streaming banner 504. The streaming banner 504 is configured to promote, market, recommend, or notify at least first and second apps (App1 and App2), which are shown scrolling or streaming from left to right. FIG. 5B shows an example unlocked home page or screen 510 that includes home page information, such as a plurality of app icons 512, and a streaming banner 514. The streaming banners 504 and 514 may be the same streaming banner. A streaming banner is displayed while the mobile device 102 is locked (e.g., streaming banner 504) and the streaming banner persists on the home page after the mobile device 102 is unlocked (e.g., streaming banner 514).

Figure 5C:
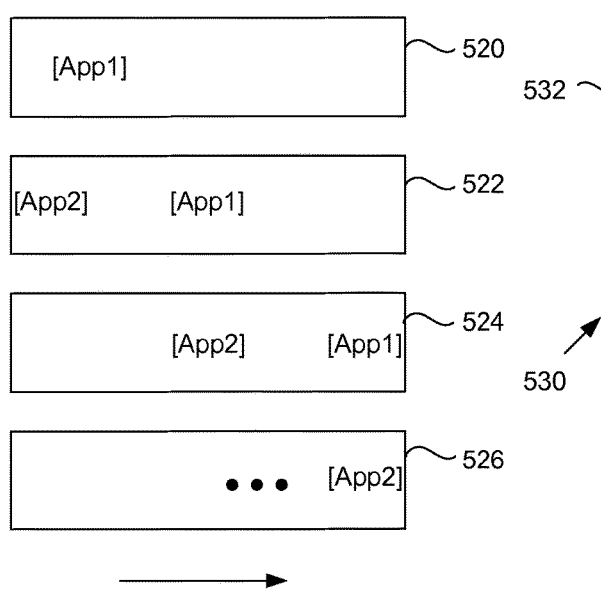

FIG. 5C shows an example time series of streaming banners displaying content progressing from left to right. Streaming banner 520 shows text, graphic, icon, hyperlink, actionable item/indicator, and other presentation material associated with App1 (collectively referred to as App1 information) displaying on the left side of the banner. Streaming banner 522 is displayed at a later point in time relative to streaming banner 520, shows the App1 information moved to the right relative to streaming banner 520. The text, graphic, icon, hyperlink, actionable item/indicator, and other presentation material associated with App2 (collectively referred to as App2 information) also starts displaying on the left side of streaming banner 522. Streaming banner 524 is displayed at a later point in time relative to streaming banner 522, shows the App1 information moved all the way to the right side and the App2 information correspondingly progressing rightward. Streaming banner 526 is displayed at a later point in time relative to streaming banner 524, and no longer shows the App1 information because it has moved off the banner. Instead, the App2 information has moved to the rightmost position on the streaming banner 526. The streaming or scrolling of the App1 information, App2 information and other content information can be on a continuous loop in the streaming banner.

Figure 5D:
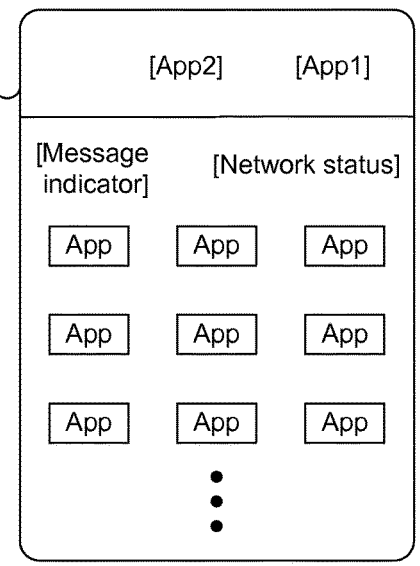

In other embodiments, the streaming banner can be positioned at one or more other pre-defined locations on the screen. FIG. 5D shows an example screen 530 including a streaming banner 532 provided at a top portion of the screen. The streaming banner can be displayed in one or more apps (e.g., web browser, downloaded apps) in addition to or as an alternative to the locked and unlocked home pages/screens. A streaming banner can display on a mobile device 102 at all times with the content changing in accordance with trigger conditions. In some example embodiments, a streaming banner 532 can be non-persistent, displaying periodically, for a set period of time, or sporadically based on specific user activity.

Once a streaming banner is presented on the mobile device 102, the mobile device 102 monitors whether the user indicates interest in the content included in the streaming banner at a block 406. The user indicates interest by taking action on the content information associated with a specific content displayed in the streaming banner. Additional details regarding user action on the streaming banner is described above with respect to block 314 of FIG. 3. If the user takes no action with respect to the banner (no branch of block 406), then flow diagram 400 returns to block 402. Otherwise the user expresses interest in specific content presented in the streaming banner (yes branch of block 406), and the given mobile device 102 receives and displays the fulfilled action request at a block 408. Additional details regarding the response to the user action on the banner is described above with respect to block 316 of FIG. 3.

In this manner, determination and configuration of streaming banners including information about one or more items/content are disclosed herein. The streaming banner displayed on a pre-determined portion of a screen of a mobile device 102 serves informational as well as commercial purposes. Provision of a streaming banner for a given mobile device 102 is triggered by either a user activity on the mobile device 102 and/or a system set condition. In response to the trigger, each of the items/content represented in the streaming banner is selected in accordance with the trigger condition and/or initial item/content identification source(s). In the case of the items/content comprising apps, one or more specific apps is selected as follows to be announced, promoted, recommended, marketed, offered for sale, or otherwise included in the streaming banner: (1) select app(s) downloaded by other users having user profiles similar to the user profile of a user of the given mobile device 102, (2) select app(s) identified/downloaded by the user's contacts/friends or those in the user's social network, (3) select app(s) matching user profile preferences or latest user activity, and/or (4) select app(s) that are already designated by an items/content store (e.g., new apps).

Figure 6:
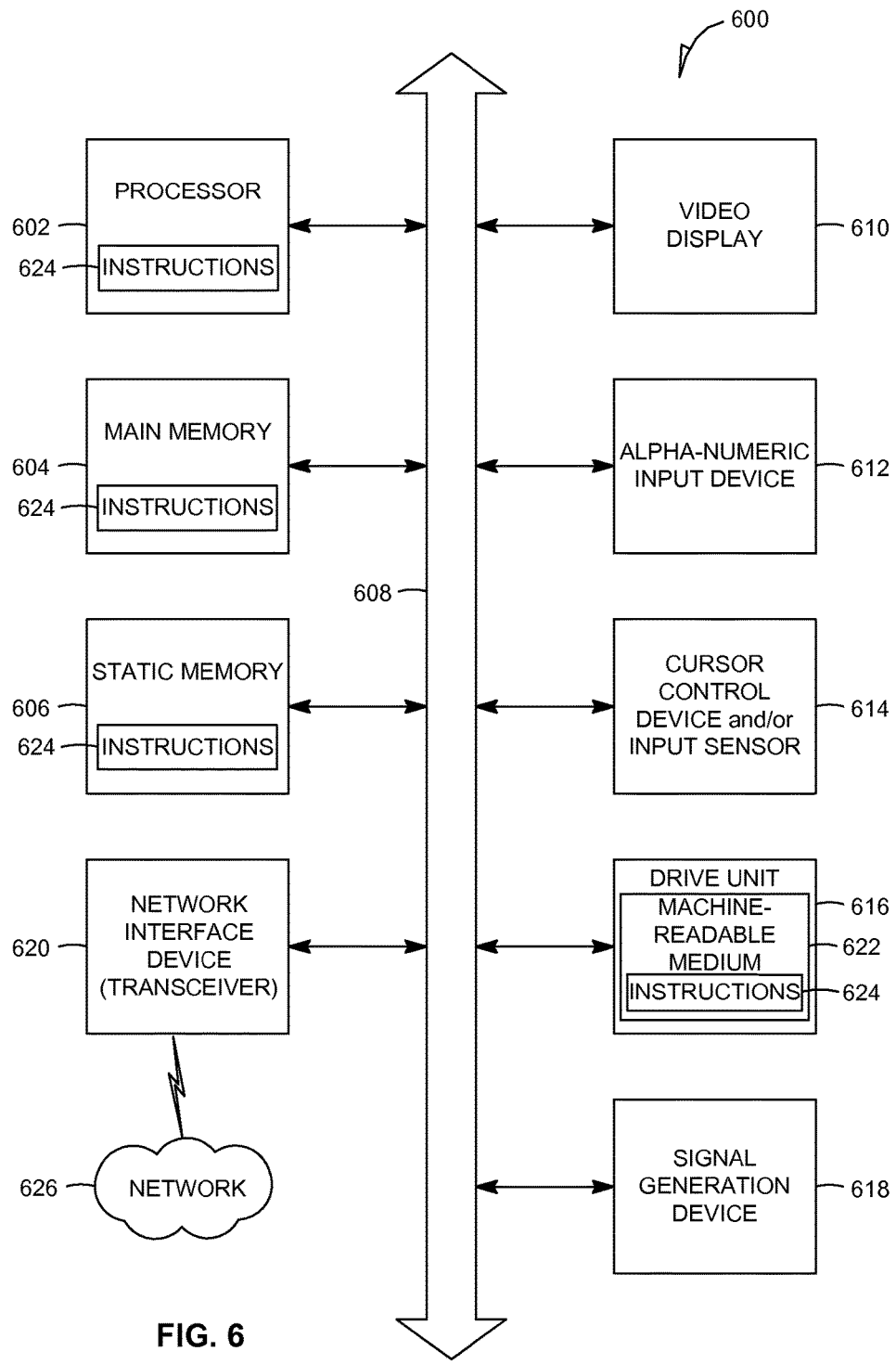
FIG. 6 shows a diagrammatic representation of a machine in the example form of a computer system within which a set of instructions are executed to cause the machine to perform any one or more of the methodologies of FIGS. 2-4 according to some embodiments.

FIG. 6 shows a diagrammatic representation of a machine in the example form of a computer system 600 within which a set of instructions, for causing the machine to perform any one or more of the methodologies discussed herein, may be executed. The computer system 600 can comprise, for example, any of the mobile devices 102, device 116, server 108, and/or server 112. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystal display (LCD), organic light emitting diode (OLED) display, touch screen, or a cathode ray tube (CRT)). The computer system 600 also includes an alphanumeric input device 612 (e.g., a keyboard, a physical keyboard, a virtual keyboard using software), a cursor control device or input sensor 614 (e.g., a mouse, a trackpad, a trackball, a sensor or reader, a machine readable information reader, bar code reader), a disk drive unit 616, a signal generation device 618 (e.g., a speaker) and a network interface device or transceiver 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method performed by a server for providing a streaming banner, the method comprising:

receiving, by a processor at a server from a mobile device, user activity information on the mobile device, the user activity information comprising at least a current location of the mobile device, the user activity information being independent of user activity with a streaming banner on at least the mobile device;

determining that the user activity information satisfies at least one condition triggering a streaming banner to be provided to the mobile device, wherein the at least one condition includes a location condition satisfied by the current location of the mobile device;

in response to determining that the user activity information satisfies the condition, selecting, by the processor, a first promoted mobile device application and a second promoted mobile device application to promote in the streaming banner based on the condition and data obtained from an initial application identification source independent of the user activity information, the initial application identification source including at least one of: a social media site, user profiles of users in the user's social network, or an application submitted to an application e-commerce site; and transmitting the streaming banner to the mobile device, wherein the streaming banner and content of the streaming banner are independent of content currently being displayed on the mobile device and configured to simultaneously present, at least temporarily, a first set of data corresponding to the first promoted mobile device application and a second set of data corresponding to the second promoted mobile device application on the mobile device.

2. The method of claim 1, wherein the first promoted mobile device application is identical to an application identified in the initial application identification source.

3. The method of claim 1, wherein the first promoted mobile device application is different from an application identified in the initial application identification source and the first promoted mobile device application shares at least one common trait with the application identified in the initial application identification source.

4. A mobile device, comprising:
a processor configured to determined user activity information comprising at least a current location of the mobile device, based on a user interfacing with the mobile device, the user activity information being independent of user activity with a streaming banner on at least the mobile device;
a transceiver configured to wirelessly transmit the user activity information to a remote server and to wirelessly receive a streaming banner from the remote server, the streaming banner comprising a first set of data corresponding to a first promoted mobile device application and a second set of data corresponding to a second promoted mobile device application, the first and second promoted mobile device applications selected by the remote server based on at least one condition triggering a streaming banner to be provided to the mobile device and a set of information associated with one or more social network contacts of the user obtained from at least one social network associated with the user independent of the user activity information, wherein the at least one condition includes at least a location condition satisfied by the current location of the mobile device; and
a display, in response to receiving the streaming banner from the remote server, configured to present the streaming banner at a pre-determined portion of a home screen, wherein:
the streaming banner and content of the streaming banner are independent of content currently displayed on the mobile device and simultaneously presents, at least temporarily, the first set of data that corresponds to the first promoted mobile device application and the second set of data that corresponds to the second promoted mobile device, and
the processor is in communication with each of the transceiver and the display.

5. The mobile device of claim 4, wherein the first promoted mobile device application is identical to an application associated with the one or more contacts.

6. The mobile device of claim 4, wherein the first promoted mobile device application is different from an application associated with the one or more contacts—but shares at least one common trait with the application.

7. The mobile device of claim 4, wherein the home screen comprises an unlocked home screen.

8. The mobile device of claim 4, wherein the home screen comprises a locked home screen.

9. The mobile device of claim 4, further comprising an input sensor configured to detect the user's interest in an actionable item corresponding to the first promoted mobile device application included in the streaming banner.

10. The mobile device of claim 9, wherein the display is configured to display a page from an application e-commerce site in response to the detected user interest, the page from the application e-commerce site including one or more of: a description of the selected first promoted mobile device application, a purchase interface for the selected first promoted mobile device application, or a download interface for the selected first promoted mobile device application.

11. A method for recommending applications on a mobile device, the method performed by a processor of the mobile device, and the method comprising:
determining user activity information comprising at least a current location of the mobile device, based on a user interfacing with the mobile device, the user activity information being independent of user activity with a streaming banner on at least the mobile device;
wirelessly transmitting, by the mobile device, the user activity information to a server;
wirelessly receiving, by the mobile device, a streaming banner from the server, the streaming banner comprising a first set of data corresponding to a first promoted mobile device application and a second set of data corresponding to a second promoted mobile device application, the first and second promoted mobile device applications selected by the remote device based on at least one condition triggering a streaming banner to be provided to the mobile device and a set of information associated with one or more social network contacts of the user obtained from at least one social network associated with the user independent of the user activity information, wherein the at least one condition includes at least a location condition satisfied by the current location of the mobile device; and
in response to receiving the streaming banner from the server, displaying the streaming banner at a pre-determined portion of a screen of the mobile device, wherein the streaming banner and content of the streaming banner are independent of content currently being displayed on the mobile device and simultaneously presents, at least temporarily, the first set of data corresponding to the first promoted mobile device application and the second set of data corresponding to the second promoted mobile device application.

12. The method of claim 11, wherein the displaying of the streaming banner includes displaying in at least two of a locked home screen, an unlocked home screen, a mobile browser screen, or a second application screen.

13. The method of claim 12, wherein the displaying of the streaming banner is persistent across at least two of: the locked home screen, the unlocked home screen, the mobile browser screen, or the second application screen.

14. The method of claim 11, wherein the streaming banner includes at least one of: a graphic, text, hyperlink, icon, or actionable item corresponding to each of the two or more promoted mobile device applications being recommended in the streaming banner.

* * * * *